July 14, 1936.  W. H. MUIRHEAD ET AL  2,047,327
LEVEL INDICATING DEVICE
Filed April 24, 1933
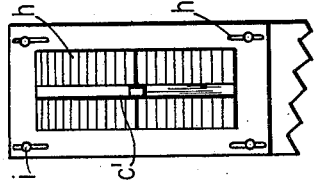
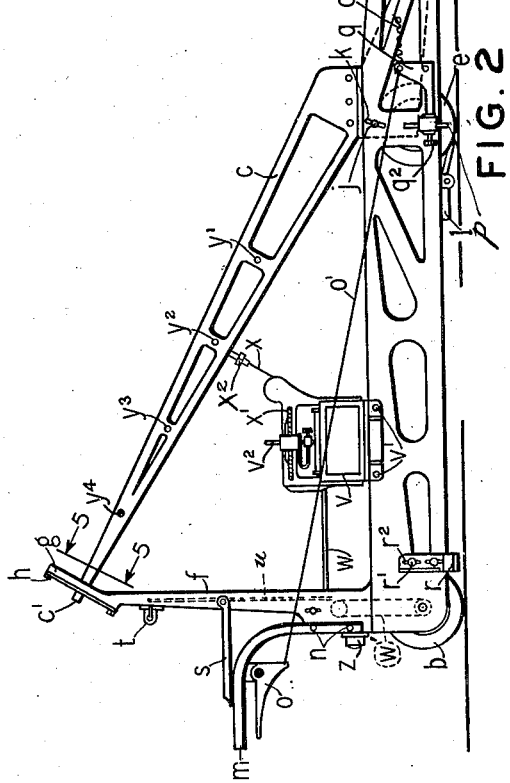
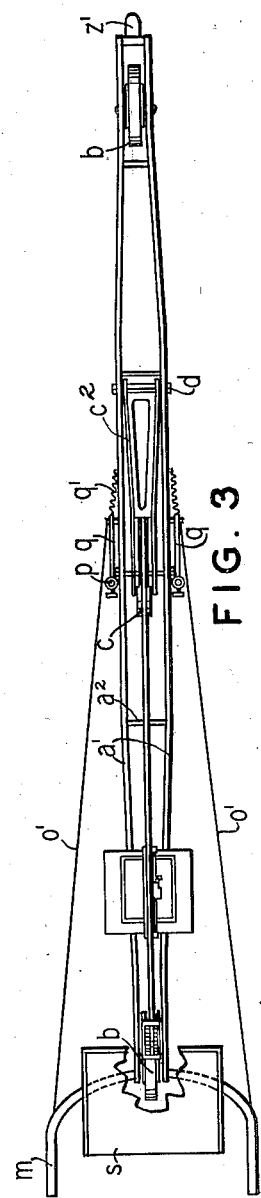
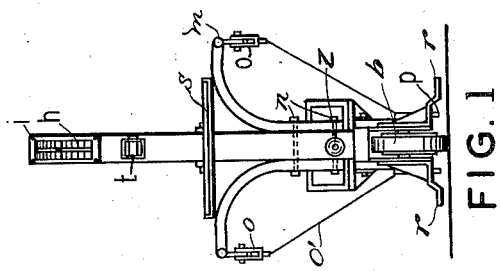
INVENTOR
WALTER H. MUIRHEAD
CLAUD WORTH MARTIN
BY
ATTORNEY Patented July 14, 1936

2,047,327

UNITED STATES PATENT OFFICE 2,047,327

LEVEL-INDICATING DEVICE

Walter H. Muirhead and Claud Worth Martin, Gold Hill, Oreg., assignors to Beaver-Portland Cement Co., Gold Hill, Oreg.

Application April 24, 1933, Serial No. 667,540

4 Claims. (Cl. 33—174)

The object of our invention is to provide a device adapted to indicate slight irregularities in an otherwise plane surface and which has particular utility in the inspection of newly laid concrete highways. In highway construction the general plane of the highway is surveyed and indicated by grade markers, but imperfections produce slight variance in the road surface with said grades. Common practice requires that a road surface be true within an eighth of an inch either above or below said grade line. At the present time the standard test is to check the surface by the use of a ten foot straight edge and if high spots over an eighth of an inch are discovered they are removed while the cement is still in a relatively plastic stage. The checking and inspection of said road surface thus follows the laying of the pavement and the inspection is made after the concrete has taken its initial set and before the concrete attains a degree of hardness which prevents it from being corrected by a scraping plate, or the like.

The object of our invention is to provide a device which is capable of being substituted for said straight edge and which is adapted to provide a continuous and progressive check of the pavement. A device of this character must be relatively inexpensive so as to be capable of being used on each project by an inspector, yet be extremely accurate to indicate the slight irregularities which it is designed to check.

After a section of pavement is constructed it is common practice for a highway engineer or district inspector to check the completed pavement to determine its freedom from irregularities. The object of our invention is further to devise our machine and to adapt the same for use with a recording graph meter by which a written and permanent record can be made of the condition of said highway. To accomplish this end the operating mechanism is devised to accommodate a recording graph meter which may be quickly installed and operatively connected to our device to produce said permanent record.

The details of construction and the mode of operation of our invention are hereinafter described with reference to the accompanying drawing, in which:

Fig. 1 is an end view of said device;
Fig. 2 is an elevation thereof;
Fig. 3 is a plan view thereof;
Fig. 4 is a fragmentary detail view showing the vertical stand with a scale carried thereby;

Our improved device comprises a longitudinal beam $a$ which is preferably formed to constitute a truss, which beam is supported at its ends by wheels $b$. Said beam comprises two beam sides $a'$ spaced apart and joined by spacers $a2$. Said beam sides do not extend parallel to each other throughout the entire length thereof, but preferably converge toward each other at the ends and thus provide closely-spaced bearings for said wheels $b$.

To make said device correspond with present testing practices, said wheels preferably are arranged on ten foot centers and thus the space spanned would equal the result attained by the use of a ten foot straight edge. Arranged intermediate said wheels the lever $c$ is pivotally mounted as at $d$. The pivotal mounting preferably is arranged toward the forward end of the machine, which is the right-hand side of the machine as is shown in Figs. 2 and 3, and rearwardly thereof a floating wheel $e$ is arranged which tends to support said lever $c$. A proportionate relation is preferably established between the spacing of said wheel $e$ with the pivotal mounting $d$ and the space from said wheel to the end $c'$ of the lever $c$. As is shown in the accompanying drawing, said spacing is arranged so that a four to one relation exists. Thus a deflection on the road surface traversed by the wheel $e$ would result in a deflection substantially four times as great at the end $c'$ of the lever.

A vertical upright $f$ is rigidly secured to the longitudinal beam $a$ and at the upper end an obliquely-arranged stand $g$ is provided. The end $c'$ of the lever extends thru said stand and rides over a calibrated scale carried by said stand. Said scale $h$ is secured to the stand by bolts or studs $i$, which pass thru elongated apertures $h'$ in said scale, so as to make the latter adjustable on the stand to provide a slight degree of correction. That is, the three wheels $b$ and $e$, respectively, are arranged so that they are exactly in line. This test is made either by stretching a length of taut piano wire across the wheels $b$ and $e$, or by arranging said wheels on a true plane surface or a straight edge. The indicator carried by the end $c'$ is then arranged to overlie exactly the base mark on said scale. Said correction is made as frequently as is required to compensate for wear or any slight change in alinement. Inasmuch as the variations in the road surface are very slight, extreme accuracy must be maintained and in a device proportioned as is shown in the drawing variations in the road surface as small as 1/100th of an inch can be noted upon said scale.

The lever $c$ adjacent the pivotal point $d$ is bifurcated as at $c2$, to promote lateral stability. A laterally-extending limit bolt $j$ joins said lever to the beam $a$ at a point spaced from the pivot $d$, said bolt preferably lying adjacent the transverse vertical plane of the axis of rotation of the floating wheel $e$. Said limit bolt passes thru an arcuate slot $k$ in the sides of the beam and bears against said sides adjacent said slot. That is, said limit bolt tends to resist lateral distortion of the lever $c$, but does not provide such a binding fit that it would interfere with the accurate and sensitive movement of said lever $c$ in following the slight irregularities of the road surface being measured. Said slot $k$ is of sufficient length to permit the end $c'$ of the lever to move the entire length of the scale $h$, but if said movement is exceeded, as when lifting the device from said surface, said unusual movement will not produce distortion of said lever.

To prevent foreign objects from accumulating upon the periphery of the floating wheel $e$, we provide a scraper $l$, which is preferably resiliently mounted and is inclined toward said wheel in the direction of motion thereof when it is being pushed forwardly.

Extending rearwardly from the upright $f$ is a pair of spaced handle bars $m$, joined to the upright by bolts $n$, but diverging rather widely therefrom. Arranged on the under surface of said handle bars are grips $o$, which serve as distant control agencies for a plurality of marking elements. That is, crayons $p$ are arranged at each side of the floating wheel $e$ and are mounted so that they can be selectively moved into position to mark the pavement to indicate variations from the normal plane either above or below said plane. Thus a crayon of one color can be moved into marking position to indicate a relative raise from said plane and the other crayon preferably of another color can be manipulated to mark a depression therefrom. Said crayons are mounted in pivotal holders $q$ normally arranged as shown in Fig. 2 by springs $q'$. In said position, said crayons are lifted clear of the highway surface. When said grips $o$ are rocked clockwise about their pivotal mountings, then said crayon holders $q$ are rotated counterclockwise by the wires $o'$, when said parts are arranged as is shown in Fig. 2, to bring the end of the crayons into the plane of the road surface. Each of said holders is adjustable by a set screw $q2$ to accommodate the crayon as it becomes worn.

Extending laterally from the beam are two adjustable feet $r$, being secured to said beam by bolts $r'$, extending thru elongated holes $r2$ in said feet. As is shown in Figs. 1 and 2, said feet are adapted to be secured so that they extend above the highway so as not to drag or interfere with the indicating mechanism. They are arranged in close proximity to said highway so that said device can be supported substantially vertical. This stability is provided to permit the operator to remove his hands from the handle bars $m$ and to make notations upon a chart carried by the pivoted tray $s$. Immediately above said tray is a distance-indicating meter or odometer $t$ directly connected with the rearward wheel $b$ by chains or other driving elements $u$ and thus the operator has arranged in grouped relation before him the indicating end of the lever moving across the scale, an indicating meter adapted to show the distance traversed by the device from the starting point, and a chart upon which notations can be made.

Said chart is arranged on the tray which extends immediately adjacent the handle bars and the control mechanism for the markers, and thus all notations can be made from the point normally assumed by the operator which might be termed an operating station, and observations also can be made from said point, or station.

If it is desired to arrange said device to make a permanent record of a highway surface, or other surface to be checked, a recording graphing meter $v$, hereinafter referred to as a recorder, is arranged upon the beam $a$ and underlying the lever $c$, as is shown in Fig. 2, being secured to said beam by bolts $y'$. A flexible shaft $w$ and chain $w'$ or similar driving mechanism operatively connects said recorder to one of the wheels $b$ and said mechanism is adapted to move the paper or other ribbon-like sheet upon which the graph is to be made thru said recorder. Said paper preferably is calibrated in units of length such, for example, as ten foot sections. A base station is established in the same manner as when the manual system of indication is used and the lever of the recorder is arranged so that when one wheel is located at said station said ribbon is arranged so that the base line underlies the recording pen $v2$.

A steel tape $x$ connects said pen with the lever $c$ and said pen is retracted by a spring $x'$. The steel tape $x$, although flexible, is of substantial strength with respect to the action of the spring $x'$ and does not elongate in resisting said spring action. The tape is continuous and is provided with an adjusting screw $x2$ pivotally connected to the lever $c$. A nut is arranged upon said adjusting screw and thus is adapted to take up slack in the tape so that the pen is correctly located when the device is supported by a plane surface. Thus every slight movement of said lever results in a corresponding movement of the pen of the recorder.

When the lever moves upwardly, as when the floating wheel $e$ is riding over a projection, the steel tape will correspondingly move the recording pen of the recorder. Said pen will be returned to its original position by the spring when the lever $c$ is again moved down to its normal position, as when the wheel is riding over a plane smooth surface. A plurality of stations are arranged on the lever $c$, the station $y2$ being arranged at a point where the pivot point is 2½ times as far away as the spacing of the floating wheel from said pivot. The station $y'$ is arranged at a point where the ratio is 2 to 1, $y3$ at a point where the ratio is 3 to 1, and $y4$ at a point where the ratio is 3½ to 1.

When it is desired to move said device from place to place, it is supported by wheel mountings (not shown) and is pulled along behind an automobile or other vehicle. Because of this factor, a tail light $z$ preferably is arranged at the rearwardly extending end of the device and a car coupler $z'$ is arranged at the forward end.

We claim:

1. In a portable level-indicating device of the character described, a wheel mounted horizontal beam, the wheels constituting said mounting being located on predetermined centers, a stand projecting upwardly from one end of said beam, a pair of guiding handles extending from the upper end of said beam and with said stand defining an operating station, an obliquely-extending lever pivotally secured at one end to the middle portion of the beam, a level-gaging element secured to said lever intermediate the ends of said lever and adapted to support the latter upon the surface being traversed by said device, a pointer operatively connected to the free end of said lever, and a scale carried by said stand and operatively arranged with respect to said pointer.

2. In a portable level-indicating device of the character described, a wheel-mounted horizontal beam, the wheels constituting said mounting being located on predetermined centers, a stand projecting upwardly from one end of said beam, a pair of guiding handles extending from the upper end of said beam and with said stand defining an operating station, an obliquely extending lever pivotally secured at one end to the middle portion of the beam, a level-gaging element secured to said lever intermediate the ends of said lever and adapted to support the latter upon the surface being traversed by said device, a pointer operatively connected to the free end of said lever, a scale carried by said stand and operatively arranged with respect to said pointer, a marker element arranged adjacent said level-gaging element and distant control means, arranged adjacent said operating station for moving said marker element into operating position.

3. In a portable level-indicating device of the character described, a wheel-mounted horizontal beam, the wheels constituting said mounting being located on predetermined centers, a stand projecting upwardly from one end of said beam, a pair of guiding handles extending from the upper end of said beam and with said stand defining an operating station, an obliquely extending lever pivotally secured at one end to the middle portion of the beam, a level-gaging element secured to said lever intermediate the ends of said lever and adapted to support the latter upon the surface being traversed by said device, a pointer operatively connected to the free end of said lever, a scale carried by said stand and operatively arranged with respect to said pointer, a plurality of marker elements arranged adjacent said level-gaging element, and selective distant control means, arranged adjacent said operating station for moving said marker elements into operating position.

4. In a portable level-indicating device of the character described, a wheel-mounted horizontal beam, the wheels constituting said mounting being located on predetermined centers, a stand projecting upwardly from one end of said beam, a pair of guiding handles extending from the upper end of said beam and with said stand defining an operating station, an obliquely-extending lever pivotally secured at one end to the middle portion of the beam, a level-gaging element secured to said lever intermediate the ends of said lever and adapted to support the latter upon the surface being traversed by said device, a pointer operatively connected to the free end of said lever, a scale carried by said stand and operatively arranged with respect to said pointer, a plurality of marker elements arranged adjacent said level-gaging element, and selective distant control means, arranged upon said guiding handles for moving said marker elements into operating position.

WALTER H. MUIRHEAD.
CLAUD WORTH MARTIN.